(12) United States Patent
Matheis

(10) Patent No.: US 9,296,045 B2
(45) Date of Patent: Mar. 29, 2016

(54) METAL-CUTTING TOOL

(75) Inventor: Klaus Matheis, Sauldorf/Rast (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 12/464,214

(22) Filed: May 12, 2009

(65) Prior Publication Data
US 2009/0263198 A1    Oct. 22, 2009

Related U.S. Application Data

(63) Continuation of application No. PCT/DE2007/002053, filed on Nov. 13, 2007.

(30) Foreign Application Priority Data

Nov. 13, 2006  (DE) .................... 20 2006 017 359 U

(51) Int. Cl.
| B23B 29/00 | (2006.01) |
| B23B 27/16 | (2006.01) |
| B23B 29/034 | (2006.01) |
| B23C 5/24 | (2006.01) |
| B23B 29/02 | (2006.01) |

(52) U.S. Cl.
CPC ....... B23B 27/1681 (2013.01); B23B 29/03417 (2013.01); B23C 5/2406 (2013.01); B23C 5/2462 (2013.01); Y10T 407/2214 (2015.01)

(58) Field of Classification Search
CPC .................... B23B 2260/056; B23B 29/03417
USPC .................................. 407/113, 41, 49, 87, 97
See application file for complete search history.

(56) References Cited

U.S. PATENT DOCUMENTS

| 2,645,844 | A | * | 7/1953 | Longe | ............................. | 407/94 |
| 3,755,868 | A | * | 9/1973 | LaForge et al. | ................. | 407/75 |
| 4,125,342 | A | * | 11/1978 | Kress | ............................ | 408/179 |
| 5,209,610 | A | * | 5/1993 | Arai et al. | ........................ | 407/36 |
| 7,037,050 | B1 | * | 5/2006 | Maier et al. | ..................... | 407/35 |

FOREIGN PATENT DOCUMENTS

| DE | 22 35 782 A1 | 2/1973 |
| DE | 198 00 440 A1 | 7/1999 |
| EP | 0 499 280 A1 | 8/1992 |

* cited by examiner

*Primary Examiner* — Will Fridie, Jr.
(74) *Attorney, Agent, or Firm* — Burr & Brown, PLLC

(57) ABSTRACT

There is provided a metal-cutting tool comprising a tool holder, a replaceable cutting plate, and an adjusting element which is attached by means of screw-fastening means elements and with which the position of the cutting plate on the tool holder can be adjusted. The screw-fastening means comprises a threaded element which interacts with the adjusting element and can be fixed in place in the tool holder.

21 Claims, 2 Drawing Sheets

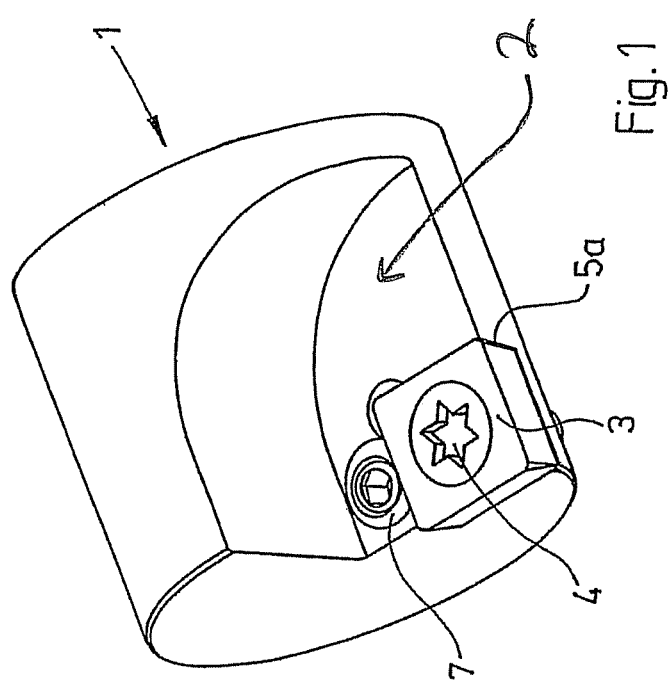

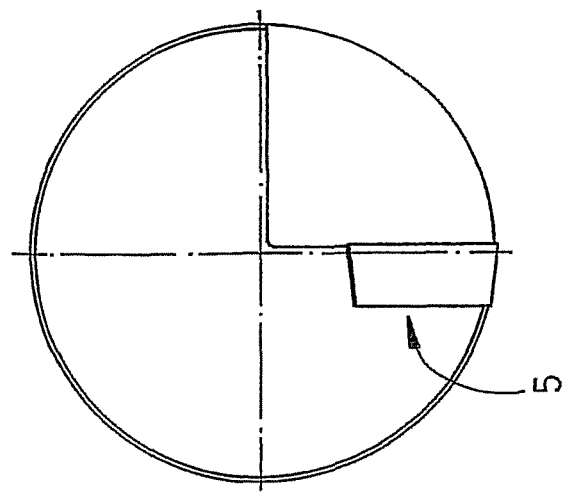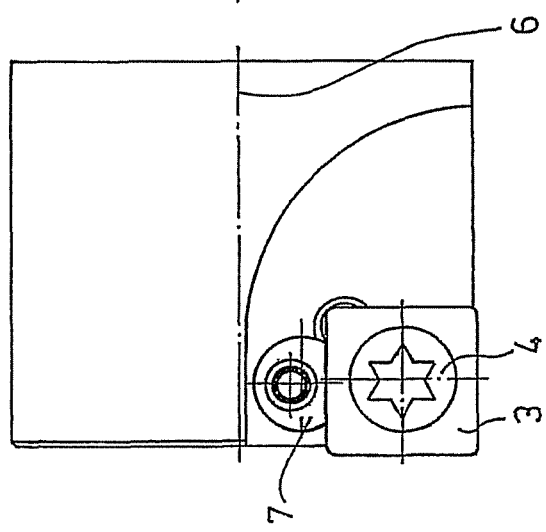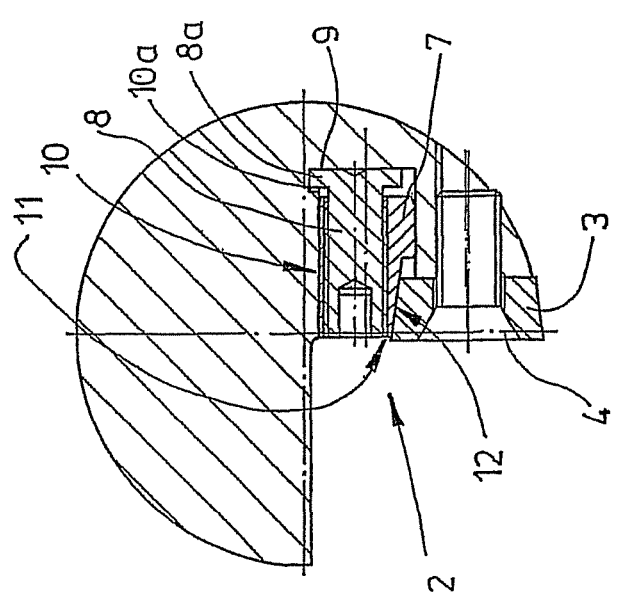

METAL-CUTTING TOOL

CROSS-REFERENCE TO RELATED APPLICATIONS

This application is a continuation of International Application No. PCT/DE2007/002053 having an international filing date of Nov. 13, 2007, and claims the benefit under 35 U.S.C. 119 sections (a)-(d) of German application 20 2006 017 359.5, filed Nov. 13, 2006, the entireties of which are incorporated herein by reference.

BACKGROUND

Embodiments of fine machining tools with indexable inserts are known in which the indexable insert projects radially and axially over a tool holder. In this known embodiment, the radial position of the indexable insert can be adjusted by means of an adjusting element in the form of a wedge element which is positioned on the radially inner side behind the indexable insert. This wedge element is positioned perpendicularly with respect to the longitudinal extent of the tool holder with a screw, with an oblique face on the wedge element interacting with a correspondingly oblique face on the indexable insert and forming a type of wedge gear, by means of which the radial positioning of the indexable insert takes place. The "fineness" of the radial positioning is determined by the inclination of the oblique faces in relation to a planar extent of the indexable insert.

In the known embodiment, the oblique face is inclined negatively to the indexable insert in relation to its planar extent. When an indexable insert is attached, the adjusting element is clamped by it. In contrast, when the indexable insert is removed, the wedge element can fall out of a corresponding recess in the tool holder. This risk is always present when the indexable insert is turned or replaced.

SUMMARY OF THE INVENTION

The invention is based on the object of improving the handling of a metal-cutting tool of the type described in the introduction with a replaceable cutting plate.

This object is achieved by the features of Claim 1.

Advantageous developments of the invention are described in the dependent claims.

The invention proceeds from a metal-cutting tool which comprises a tool holder, a replaceable cutting plate for chip removal and an adjusting element, in particular a wedge element, which is attached by means of screw-fastening means and with which the position of the cutting plate on the tool holder can be adjusted. The core of the invention consists in that the screw-fastening means comprise a threaded element which interacts with the adjusting element, wherein the threaded element is fixed in position, at least in the axial direction, in the tool holder. This means that the adjusting element can be attached to the tool holder in such a manner that when the indexable insert is removed a more secure retention of the adjusting element on the tool holder is ensured, in a manner of speaking as an undetachable part.

The tool can rotate or be arranged against a rotating workpiece.

The adjusting element can be configured such that either the radial or axial position of the cutting plate can be adjusted. It is however also possible to configure and/or position an adjusting element in such a manner that both the radial and axial position of the cutting plate can be adjusted in a single adjusting operation. To this end, guide faces for the cutting plate are designed correspondingly. Moreover, the adjusting element should preferably exert both a radial and an axial force component on the cutting plate.

Moreover, it is advantageous when the adjusting element has a radial projection which engages in a cut-out recess on the tool holder. This measure means that the screw-fastening means can be fixed in place together with the adjusting element on the tool holder with comparatively little outlay.

In a particularly preferred configuration, the threaded element is positioned eccentrically or non-coaxially in relation to a recess in the tool holder, in which the adjusting element is arranged in an axially displaceable manner. This measure ensures that the threaded element can be held in place securely. In some embodiments, the threaded element with the projection is inserted into a recess for the adjusting element on the tool holder, so that the projection engages in the cut-out. The adjusting element is then inserted into the recess by turning the screw-fastening element. When the adjusting element is inserted, the geometries are preferably such that the projection on the threaded element can no longer leave the cut-out on the tool holder.

The projection on the threaded element is preferably configured as a circumferential collar. The collar can form a type of foot which bears on the "base" of the recess. It is however also conceivable for the projection to be positioned between the ends somewhere on the longitudinal extent of the threaded element.

In an even more advantageous embodiment of the invention, the cut-out is configured as a relief groove in the recess for the adjusting element. For example, the recess is a bore in the tool holder, at the foot of which an undercut in the form of a relief groove is machined over part of the circumference. The threaded element preferably runs non-coaxially in relation to a guide section of the adjusting element (e.g., a wedge element), which is arranged in a displaceable manner in a recess of the tool holder, in the adjusting element. This means it can be ensured that, when the adjusting element is inserted in the recess provided for it, the projection on the threaded element can no longer become disengaged from the cut-out of the recess to the extent that the threaded element and adjusting element could be removed.

It is furthermore preferred for fastening the threaded element and adjusting element that the threaded element engages with a threaded section in a corresponding threaded section on the adjusting element. The threaded element preferably runs in the adjusting element. In an even more preferred configuration of the invention, actuating means are provided on the threaded element so that the threaded element can be operated with a tool from the side of the replaceable cutting plate. For example, a hexagon socket, a torx socket or the like is provided.

It is however also conceivable for the threaded element to be operated from a side which is opposite the cutting plate, for example through a bore in the tool holder. This procedure has the advantage that a recess for receiving a tool on the threaded element is exposed to comparatively less dirt when the metal-cutting tool is used, as it is situated in the "machining shadow", in a manner of speaking.

Furthermore, it is preferred that the longitudinal axis of the adjusting element runs perpendicularly to a bottom face of the cutting plate. An arrangement of the adjusting element at a non-right angle to a bottom face of the cutting plate is also possible. This means that favorable adjustment conditions for the cutting plate can be achieved in relation to a bearing face on the cutting plate, by the alignment of the longitudinal axis of the adjusting element being adapted to the bottom face of the cutting plate.

BRIEF DESCRIPTION OF THE DRAWINGS

An exemplary embodiment of the invention is shown in the drawings and explained in more detail while giving further advantages and details. In the figures, FIG. 1 shows a perspective view of the front part of a fine machining tool with an indexable insert, FIGS. 2a to 2c show the front part of a fine machining tool according to FIG. 1 in side view (FIG. 2b), plan view (FIG. 2c) and sectional view (FIG. 2a).

DETAILED DESCRIPTION OF THE EXEMPLARY EMBODIMENT

In the figures, the front part of a fine machining tool 1 is shown. In a recess 2, which is segment-shaped as seen from above, an indexable insert 3 (in this embodiment, a cutting plate) is mounted by means of a screw 4 in a depression 5 in the recess 2.

The indexable insert 3 bears against a fixed stop 5a in the depression 5 in a direction along a longitudinal axis 6.

The indexable insert 3 can be adjusted in the radial direction by means of an adjusting element 7 (in this embodiment, the adjusting element 7 is a wedge element).

To this end, a threaded element (in this embodiment, an adjusting screw 8) is turned by means of a hexagon socket which is screwed into a matching internal thread in the adjusting element 7.

The adjusting screw is supported against the bottom 9 of a recess 10. A part of the adjusting element 7, which is configured to match the recess 10, is guided in the recess 10.

When the screw 8 is turned, the adjusting element 7 is either pushed inwards into the recess 10 or pushed in the opposite direction out of it.

A correspondingly shaped wedge face 11 slides on a matching face 12 on the indexable insert 3.

The faces have an inclination of for example 7 degrees to the vertical on a planar extent of the indexable insert 3.

The smaller this angle, the more sensitively the indexable insert can be radially adjusted by pushing the adjusting element 7 along the faces 11, 12. The end region of the adjusting screw 8 has a circumferential edge 8a.

When the adjusting element and adjusting screw are in the inserted state, the edge 8a sits in a relief groove 10a in the recess 10.

This makes it impossible for the adjusting screw 8 to fall out of the recess 10, even when the indexable insert 3 is removed when it is for example being replaced or turned. Moreover, the adjusting element can be turned both outwards and inwards in a defined manner as the screw 8 is fixed in place.

In order to allow the edge 8a to be introduced into the relief groove 10a, it is preferred if the adjusting screw 8 runs eccentrically in the adjusting element 7 in relation to its respective longitudinal axes.

Correspondingly, the adjusting screw 8 also sits non-coaxially in relation to the longitudinal extent of the recess 10 in which the adjusting element 7 is guided.

In order to insert the adjusting screw 8 and adjusting element 7, the adjusting screw 8 is preferably positioned in the recess 10 with the edge 8a in the relief groove 10a. The adjusting element 7 is then placed on and drawn into the recess 10 by turning the adjusting screw 8.

The indexable insert can then be mounted and positioned in a known manner.

The relief groove and the edge 8a which engages therein mean that the adjusting means consisting of adjusting element 7 and adjusting screw 8 are arranged undetachably in the recess 10.

The invention claimed is:

1. A metal-cutting tool comprising:
   a tool holder;
   an adjusting element; and
   an adjusting screw,
   the adjusting element having adjusting element threads,
   the adjusting screw having adjusting screw threads, an actuation region, and a projection that extends farther from a longitudinal axis of the adjusting screw than the adjusting screw threads extend from the longitudinal axis of the adjusting screw,
   the adjusting screw threads on an outer surface of the adjusting screw, helical relative to the longitudinal axis of the adjusting screw,
   the actuation region located at a first end of the adjusting screw,
   the projection located at a second end of the adjusting screw,
   the projection axially spaced from the actuation region relative to the longitudinal axis of the adjusting screw,
   the adjusting screw threads threaded with the adjusting element threads, whereby rotating the adjusting screw about the longitudinal axis causes the adjusting element to move due to the threading of the adjusting element threads with the adjusting screw threads, while the adjusting screw does not move axially along the longitudinal axis.

2. The tool according to claim 1, wherein the tool holder comprises a cut-out, and said projection extends radially relative to the longitudinal axis beyond the adjusting screw threads, said projection engageable with said cut-out.

3. The tool according to claim 1, wherein said tool holder comprises a recess, and wherein said adjusting screw is positioned non-coaxially in relation to said recess in said tool holder, and wherein said adjusting element is arranged in an axially displaceable manner.

4. The tool according to claim 1, wherein said projection comprises a circumferential collar.

5. The tool according to claim 1, wherein the tool holder comprises a recess, and wherein the tool holder comprises a cut-out which is configured as a relief groove in said recess for said adjusting element.

6. The tool according to claim 1, wherein the tool holder comprises a recess, and wherein said adjusting element comprises a guide section, and wherein said adjusting screw runs non-coaxially in relation to said guide section of the adjusting element, which is arranged in a displaceable manner in said recess of the tool holder, in the adjusting element.

7. The tool according to claim 1, wherein said projection is configured as a foot.

8. The tool according to claim 1, wherein said projection is spaced from the ends of said adjusting screw.

9. The tool according to claim 1, wherein said adjusting screw can be operated with a tool from the side of a replaceable cutting plate.

10. The tool according to claim 1, wherein said threaded element can be operated with a tool from a side which is opposite said tool holder.

11. The tool according to claim 1, wherein the tool further comprises a replaceable cutting plate, and a longitudinal axis of said adjusting element runs perpendicularly with respect to a bottom face of said cutting plate.

12. The tool according to claim 1, wherein the tool further comprises a replaceable cutting plate, and a longitudinal axis of said adjusting element is at a non-right angle with respect to a bottom face of said cutting plate.

13. The tool according to claim 1, wherein the adjusting screw comprises screw-fastening means for interacting with the adjusting element.

14. The tool according to claim 1, wherein rotating the adjusting screw about a longitudinal axis causes the adjusting element to move in a direction parallel to the longitudinal axis due to the threading of the adjusting element threads with the adjusting screw threads.

15. The tool according to claim 1, wherein the metal tool further comprises a cutting plate attached to the tool holder with a screw in a depression in a recess in the metal tool.

16. The tool according to claim 15, wherein the adjusting element comprises a wedge face that slides on a matching face on the cutting plate.

17. The tool according to claim 15, wherein the adjusting element comprises a wedge face that slides on a matching face on the cutting plate, whereby movement of the adjusting element caused by rotating the adjusting screw causes movement of the cutting plate at least in a direction perpendicular to the longitudinal axis of the adjusting screw.

18. A metal-cutting tool as recited in claim 1, wherein:
the metal-cutting tool further comprises a cutting plate mounted on the tool holder, and
rotating the adjusting screw while the cutting plate remains mounted on the tool holder changes the position where the cutting plate is mounted on the tool holder.

19. A metal-cutting tool comprising:
a tool holder;
an adjusting element; and
an adjusting screw,
the tool holder comprising a first surface and a recess in the first surface,
the recess having a relief groove spaced from the first surface,
the adjusting screw in the recess,
the adjusting element having adjusting element threads,
the adjusting screw having adjusting screw threads that are threaded with the adjusting element threads, whereby rotating the adjusting screw about a longitudinal axis causes movement of the adjusting element due to the threading of the adjusting element threads with the adjusting screw threads, while the adjusting screw does not move axially along the longitudinal axis,
the adjusting screw having a projection that extends into the relief groove to a position that is farther from a longitudinal axis of the adjusting screw than the adjusting screw threads are from the longitudinal axis of the adjusting screw.

20. A metal-cutting tool as recited in claim 1, wherein the actuation element is substantially at a surface of said adjusting screw that is on a first end of the adjusting screw.

21. A metal-cutting tool as recited in claim 1, wherein a cutting plate is mounted on the tool holder, and said movement of the adjustment element causes movement of the cutting plate.

* * * * *